United States Patent
Hailemariam et al.

(10) Patent No.: US 9,292,972 B2
(45) Date of Patent: Mar. 22, 2016

(54) OCCUPANT CENTRIC CAPTURE AND VISUALIZATION OF BUILDING PERFORMANCE DATA

(75) Inventors: Ebenezer Hailemariam, Toronto (CA); Gord Kurtenbach, Toronto (CA); Azam Khan, Aurora (CA); Ramtin Attar, Toronto (CA); Alexander Tessier, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 547 days.

(21) Appl. No.: 13/109,782

(22) Filed: May 17, 2011

(65) Prior Publication Data

US 2012/0296610 A1    Nov. 22, 2012

(51) Int. Cl.
*G06F 17/50*    (2006.01)
*G06T 19/00*    (2011.01)

(52) U.S. Cl.
CPC .......... *G06T 19/00* (2013.01); *G06T 2210/04* (2013.01)

(58) Field of Classification Search
CPC ........... G05B 15/02; G05B 2219/2642; F24F 11/001; F24F 11/0086; G06F 17/5004; G06T 13/20; G06T 2210/04; G06T 15/06; G06T 15/08; G06T 17/00; G06T 2219/2012; G06T 19/00
USPC ............................................. 703/1; 345/426
See application file for complete search history.

(56) References Cited

U.S. PATENT DOCUMENTS

| | | | |
|---|---|---|---|
| 5,956,041 A * | 9/1999 | Koyamada et al. | 345/420 |
| 6,473,708 B1 * | 10/2002 | Watkins et al. | 702/130 |
| 6,831,652 B1 * | 12/2004 | Orr | 345/543 |
| 6,980,690 B1 * | 12/2005 | Taylor et al. | 382/154 |
| 6,993,417 B2 * | 1/2006 | Osann, Jr. | G05B 15/02 340/635 |
| 7,133,044 B2 * | 11/2006 | Maillot et al. | 345/423 |
| 7,567,844 B2 * | 7/2009 | Thomas et al. | 700/19 |
| 7,620,227 B2 * | 11/2009 | Gering et al. | 382/128 |
| 7,664,574 B2 * | 2/2010 | Imhof et al. | 700/276 |
| 8,233,008 B2 * | 7/2012 | Jin et al. | 345/619 |
| 8,290,559 B2 * | 10/2012 | Shariati et al. | 600/345 |
| 8,315,839 B2 * | 11/2012 | Rosca et al. | 703/1 |
| 8,532,962 B2 * | 9/2013 | Zhang et al. | 703/1 |
| 8,638,328 B2 * | 1/2014 | Lin | 345/419 |
| 8,682,937 B2 * | 3/2014 | Ludwig | 707/802 |
| 8,843,354 B2 * | 9/2014 | Lugo | G06F 17/5009 703/1 |

(Continued)

OTHER PUBLICATIONS

McGlinn et al, "SimCon: A Tool to Support Rapid Evaluation of Smart Building Application Design Using Context Simulation and Virtual Reality", Journal of Universal Computer Science, vol. 16, No. 15, 2010.*

(Continued)

*Primary Examiner* — Kamini S Shah
*Assistant Examiner* — Juan Ochoa
(74) *Attorney, Agent, or Firm* — Artegis Law Group, LLP

(57) ABSTRACT

A computer implemented method for 3-D visualization of a building module and building related data includes receiving attributes of a plurality of building modules from a building information model and receiving data inputs from a plurality of sensors located in at least a subset of the plurality of building modules. The building related data is calculated for each of the plurality of building modules based on the data inputs. A 3-D visualization data of a selected building module in the plurality of building modules is generated for display on a computer screen.

19 Claims, 9 Drawing Sheets
(5 of 9 Drawing Sheet(s) Filed in Color)

(56) References Cited

U.S. PATENT DOCUMENTS

| | | | |
|---|---|---|---|
| 9,043,163 B2* | 5/2015 | Mezic | G01R 19/00 702/24 |
| 2003/0028269 A1 | 2/2003 | Spriggs et al. | |
| 2005/0278047 A1* | 12/2005 | Ahmed | 700/97 |
| 2008/0062167 A1* | 3/2008 | Boggs et al. | 345/419 |
| 2009/0326884 A1* | 12/2009 | Amemiya et al. | 703/6 |
| 2010/0070241 A1 | 3/2010 | Opdahl et al. | |
| 2010/0114383 A1 | 5/2010 | Rosca et al. | |
| 2010/0235206 A1 | 9/2010 | Miller et al. | |
| 2010/0280836 A1 | 11/2010 | Lu et al. | |
| 2010/0283626 A1 | 11/2010 | Breed | |
| 2010/0313162 A1 | 12/2010 | Preysman et al. | |
| 2011/0040529 A1* | 2/2011 | Hamann et al. | 703/1 |
| 2012/0035887 A1* | 2/2012 | Augenbraun et al. | 703/1 |
| 2012/0143516 A1* | 6/2012 | Mezic et al. | 702/24 |

OTHER PUBLICATIONS di Laurea, Tesi, "SPinV: A Dynamic Indoor 3D Wayfinding Platform", University of Rome, Sep. 9, 2010.*

Attar et al, "BIM-Based Building Dashboard", SimAUD 2010, Apr. 12-15, 2010.*

Autodesk, "Building Performance Analysis Using Revit", Revit 2008 Products, 2007.*

Chen et al, "The Design and Implementation of a Smart Building Control System", IEEE International Conference on e-Business Engineering, 2009.*

Choi et al, "Developing Ubiquitous Space Information Model for Indoor GIS Service in Ubicomp Environment", Fourth International Conference on Networked Computing and Advanced Information Management, 2008.*

Becker et al, "Reference Model for the Quality of Context Information", Center for Excellence, 627, Spatial World Models for Mobile Context-Aware Applications, Feb. 11, 2010.*

Glueck et al, "Multiscale 3D Reference Visualization", Autodesk Research, I3D Feb. 27-Mar. 1, 2009.*

Hailemariam et al, "Toward a Unified Representation System of Performance-Related Data", 6th IBPSA Canada Conference, May 19-20, 2010.*

Kiviniemi et al, "Integrated Product Management Models in Life-Cycle Evaluation and Management of The Build Environment", VVT Building and Transport, 2005.*

Cohen et al, "Real Time Discrete Shading", The Visual Computer 6:16-27, 1990.*

Johnston et al, "ArcGIS 9 Using ArcGIS Geostatistical Analyst", 2003.*

Gibson, Sarah, "Using Distance Maps for Accurate Surface Representation in Sampled Volumes", Mitsubishi Electric Research Laboratories, Dec. 1999.*

Post et al, "Visual Representation of Vector Fields", Contribution to the book of the ONR Workshop on Data Visualization, Sep. 3, 1993.*

Wilhelms et al, "Direct Volume Rendering of Curvilinear Volumes", Computer Graphics, vol. 24, No. 5, Nov. 1990.*

Makjawi et al, "Advanced Building Simulation", Spon Press, 2004.*

Ekins, Brian "How Deep is the Rabbit Hole? Examining the Matrix and Other Inventor Math and Geometry Objects", Autodesk University, Dec. 3, 2008).*

Walmsley, Kean, "Temporarily Shading a Face of an AutoCAD Solid using .Net", Through the Interface, Jun. 28, 2010.*

La Solutions, "MicroStationAPl C++ Project: View Transients", last updated Mar. 5, 2011, downloaded from www.la-solutions.co.uk.*

Walder et al, "A Context-Adaptive Building Information Model for Disaster Management", IABSE Symposium Report, pp. 53-60, Jan. 1, 2008.*

Budroni et al, "Automatic 3D Modelling of Indoor Manhattan-World Scenes from Laser Data", International Archives of Photogrammetry, Remote Sensing and Spatial Information Sciences, 2010.*

Backes, Dietmar, et al., "Chadwick GreenBIM: Advancing Operational Understanding of Historical Buildings with BIM to Support Sustainable Use", 2000.*

International Search Report for PCT/US2012/038459, Dated Jul. 17, 2012.

* cited by examiner

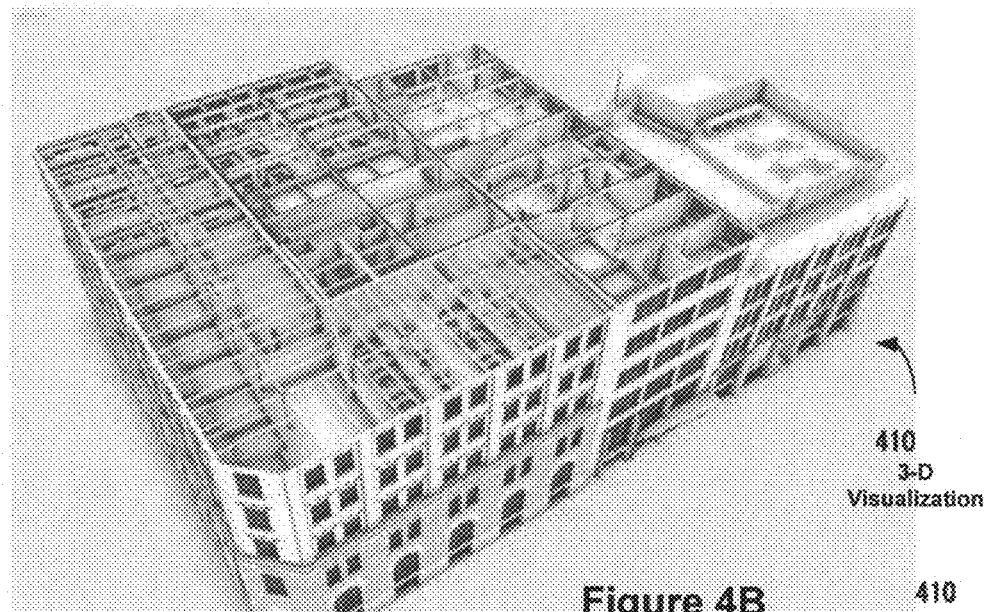
Figure 4B 410 3-D Visualization
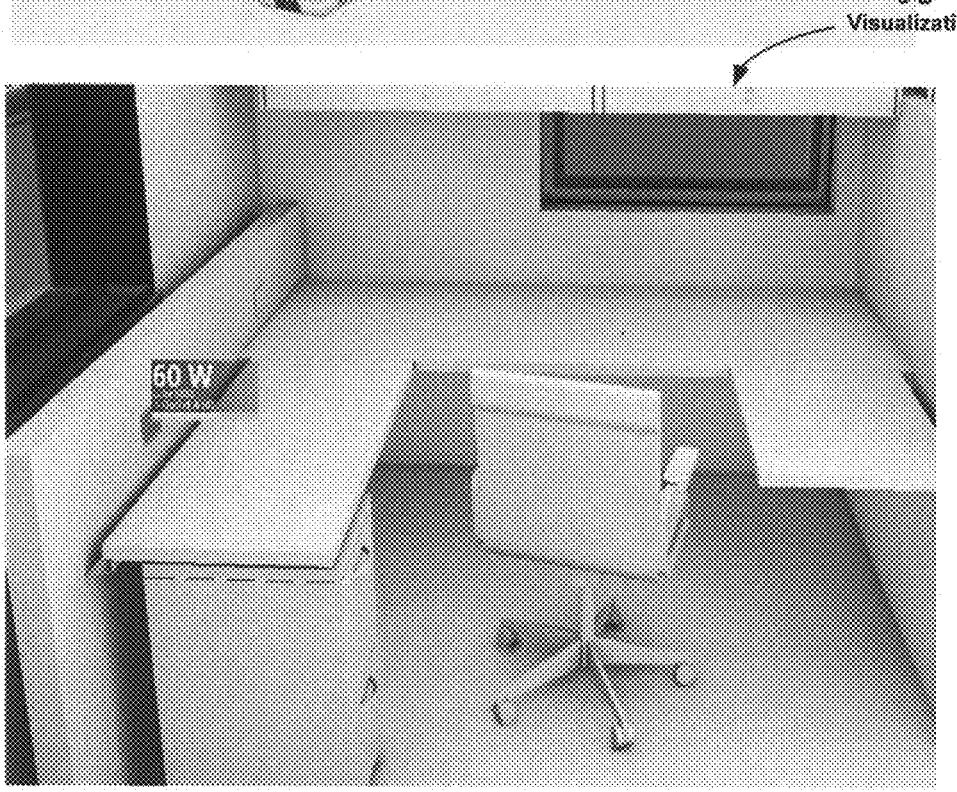
410 3-D Visualization
Figure 4C

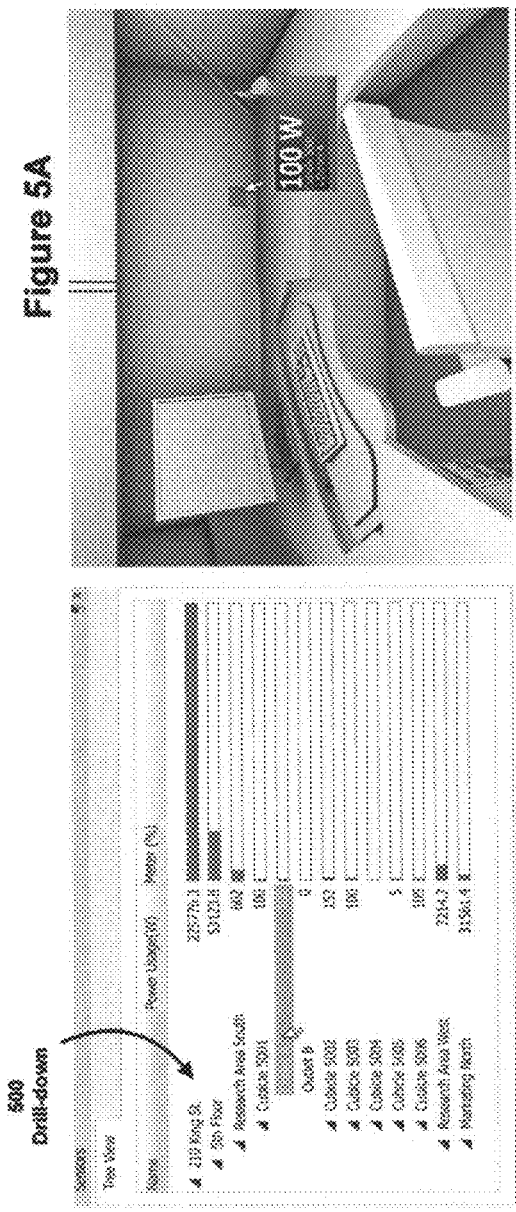

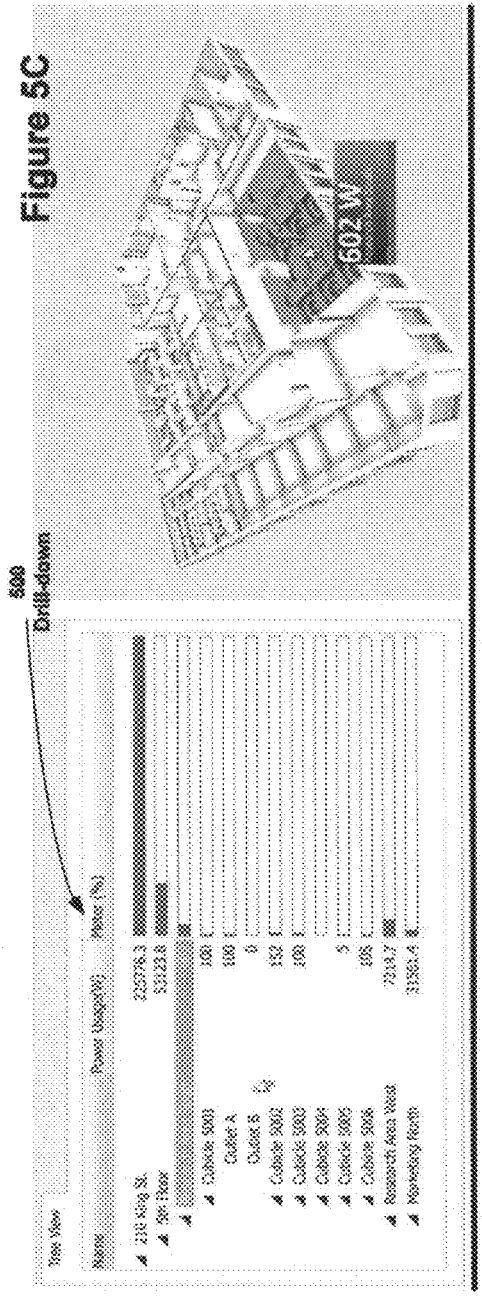

OCCUPANT CENTRIC CAPTURE AND VISUALIZATION OF BUILDING PERFORMANCE DATA

BACKGROUND OF THE INVENTION

1. Field of the Invention

Embodiments of the present invention relate generally to a computer-implemented method for generating visual representations of building modules and more particularly creating computing dashboard for displaying 3-D visualization of building related data.

2. Description of the Related Art

Building Information Model (BIM) is a building design methodology characterized by the creation and use of coordinated, internally consistent computable information about a building project in design and construction. BIM methodology employs objects that may be abstract or conceptual, and produces data models that include building geometry, spatial relationships, geographic information, and quantities and properties of building components.

Many BIM authoring tools or software tools are available to create the BIM data models for buildings. A building architect may use these tools to create modular objects representing building modules. For example, an architect may create a model object of a room in which the characteristics and attributes of the room need to be defined only once. Once defined, the model object can then be moved, used and re-used as appropriate. BIM design tools then allow for extracting different views from a building model for drawing production and other uses. These different views are automatically consistent—in the sense that the objects are all of a consistent size, location, specification—since each object instance is defined only once.

BIM data models are typically stored in Industry Foundation Classes (IFC) format to facilitate interoperability in the building industry. The IFC format is a data representation standard and file format used to define architectural and construction-related CAD graphic data as 3D real-world objects. The main purpose of the IFC format is to provide architects and engineers with the ability to exchange data between CAD tools, cost estimation systems and other construction-related applications. The IFC standard provides a set of definitions for some or all object element types encountered in the building industry and a text-based structure for storing those definitions in a data file. The IFC format also allows a BIM data model author to add locations and types of sensors in a building. Modern BIM systems are able to create rich internal representations on building components. The IFC format adds a common language for transferring that information between different BIM applications while maintaining the meaning of different pieces of information in the transfer. This reduces the need of remodeling the same building in each different application.

Although visualization techniques have been used to interpret BIM data models, such techniques have been limited to 2D graphs or abstract numerical outputs. In particular, existing building dashboard systems, that visualize information collected from sensors distributed throughout a building, typically show the raw data values as simple text labels on 2D floor plans, this reduction is data access makes it very difficult for users to understand complex interacting factors that affect overall building performance. Furthermore, current visualization techniques generally do not directly relate spatial and non-spatial data.

Another limitation of a typical building performance data visualization methodology is that occupants are generally treated as "passive participants" within an environment controlled through a centralized automation system, and the entire interior space is generally treated as a homogenous environment.

SUMMARY OF THE INVENTION

One embodiment of the present invention sets forth a computer implemented method of 3-D visualization of a building module and building related data. The method includes receiving attributes of a plurality of building modules from a building information model and receiving data inputs from a plurality of sensors located in at least a subset of the plurality of building modules. The building related data is calculated for each of the plurality of building modules based on the data inputs. A 3-D visualization of a selected building module in the plurality of building modules is generated based on the attributes of the selected building module for display on a computer screen.

In another embodiment, a computer generated visualization dashboard is disclosed. The visualization dashboard includes a drill-down user interface. The drill-down user interface includes a hierarchy of a plurality of building modules. Each node in the hierarchy is selectable by a user. The visualization dashboard further includes a 3-D image of a selected building module. The 3D image includes geometrical features of the selected building module and a display of building related data pertaining to the selected building module.

In yet another embodiment, a method of generating a 3-D representation of a building module is disclosed. The method includes selecting the building module from a plurality of building modules through a user interface on a computer screen. The user interface includes a drill-down user interface for displaying a hierarchical list of the plurality of building modules. The method further includes providing input, through the drill-down user interface, to cause the computer screen to display a 3-D representation of the building module. The 3-D representation includes geometrical features of the building module. The user provides input, through the drill-down user interface, to cause the computer screen to display a graphical representation of building related data of the selected building module in the 3-D representation.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided to the Patent and Trademark Office upon request and payment of the necessary fee.

FIG. 4B illustrates an exemplary 3-D visualization of a building including a plurality of building cubes, according to one embodiment of the present invention.

FIG. 4C illustrates an exemplary 3-D visualization of a building cube, according to one embodiment of the present invention.

FIGS. 5A-5D illustrate exemplary drill-down visualization of building modules, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
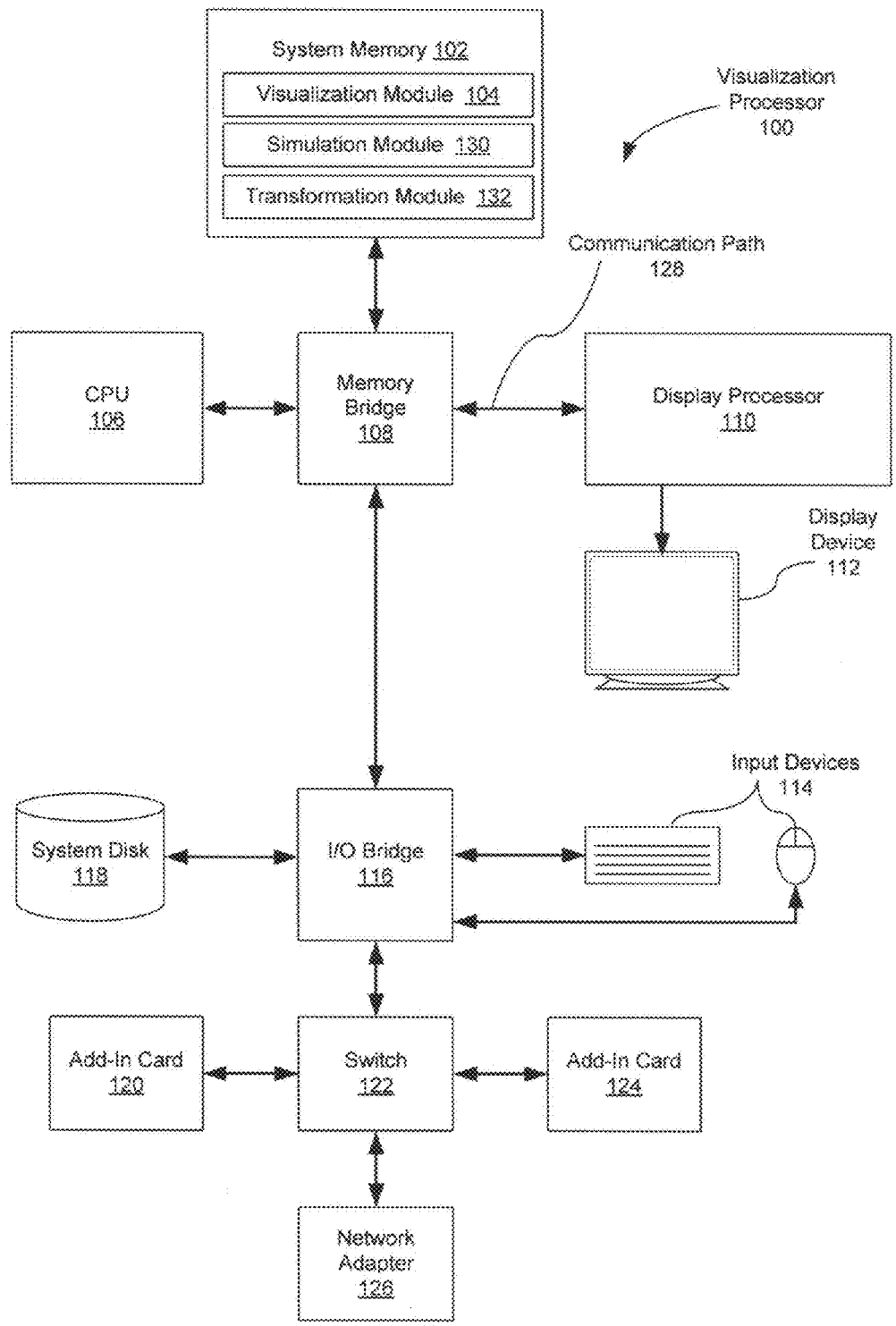
FIG. 1 is a logical diagram of a visualization processor, according to one embodiment of the present invention.

FIG. 1 illustrates an exemplary visualization processor 100 configured to implement one or more aspects of the present invention. Visualization processor 100 may be a computer workstation, personal computer, video game console, personal digital assistant, rendering engine, mobile phone, hand held device, smart phone, super-smart phone, or any other device suitable for practicing one or more embodiments of the present invention.

As shown, visualization processor 100 includes one or more processing units, such as central processing unit (CPU) 106, and a system memory 102 communicating via a bus path 128 that may include a memory bridge 108. CPU 106 includes one or more processing cores, and, in operation, CPU 106 is the master processor of visualization processor 100, controlling and coordinating operations of other system components. System memory 102 stores software applications (e.g., a visualization module 104, a simulation module 130 and a transformation module 132) and data for use by CPU 106. Simulation module 130 provides programming logic for calculating additional data points based on input data from sensors. Transformation module 132 is used to transform input data from sensors to conform to the requirements of visualization module 104, which renders 3-D visualization based on BIM data models, input data from sensors and additional data points generated by simulation module 130. CPU 106 runs software applications and optionally an operating system. Memory bridge 108, which may be, e.g., a Northbridge chip, is connected via a bus or other communication path (e.g., a HyperTransport link) 128 to an I/O (input/output) bridge 116. I/O bridge 116, which may be, e.g., a Southbridge chip, receives user input from one or more user input devices 114 (e.g., keyboard, mouse, joystick, digitizer tablets, touch pads, touch screens, still or video cameras, motion sensors, and/or microphones) and forwards the input to CPU 106 via memory bridge 108.

In one embodiment, visualization processing module 104 is stored in system memory 102. visualization processing module 104 is any application that when executed on CPU 106 processes input data and generates 3-D visualization on a computer terminal. In alternative embodiments, visualization processing module 104 is a Web application, that is stored on a remote server and accessed through network adapter 126.

One or more display processors, such as display processor 110, are coupled to memory bridge 108 via a bus or other communication path 128 (e.g., a PCI Express, Accelerated Graphics Port, or HyperTransport link); in one embodiment display processor 110 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 110 periodically delivers pixels to a display device 112 (e.g., a screen or conventional CRT, plasma, OLED, SED or LCD based monitor or television). Additionally, display processor 110 may output pixels to film recorders adapted to reproduce computer generated images on photographic film. Display processor 110 can provide display device 112 with an analog or digital signal.

A system disk 118 may also connected to I/O bridge 116 and is configured to store content and applications and data for use by CPU 106 and display processor 110. System disk 118 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 122 provides connections between I/O bridge 116 and other components such as a network adapter 126 and various add-in cards 120 and 124. Network adapter 126 allows computer system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 116. For example, an audio processor is used to generate analog or digital audio output from instructions and/or data provided by CPU 106, system memory 102, or system disk 118. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 110 incorporates circuitry optimized for 3-D graphics simulations and video processing, including, for example, video output circuitry, and constitutes a graphics processing unit (GPU). In another embodiment, display processor 110 incorporates circuitry optimized for general purpose processing. In yet another embodiment, display processor 110 is integrated with one or more other system elements, such as the memory bridge 108, CPU 106, and I/O bridge 116 to form a system on chip (SoC). In still further embodiments, display processor 110 is omitted and software executed by CPU 106 performs the functions of display processor 110.

Pixel data can be provided to display processor 110 directly from CPU 106. In some embodiments of the present invention, instructions and/or data representing a scene are provided to a render farm or a set of server computers, each similar to computer system 100, via network adapter 126 or system disk 118. The render farm generates one or more rendered images of the scene using the provided instructions and/or data. These rendered images are stored on computer-readable media in a digital format and optionally returned to computer system 100 for display. Similarly, stereo image pairs processed by display processor 110 are output to other systems for display, stored in system disk 118, or stored on computer-readable media in a digital format.

Alternatively, CPU 106 provides display processor 110 with data and/or instructions defining the desired output images, from which display processor 110 generates the pixel data of one or more output images, including characterizing and/or adjusting the offset between stereo image pairs. The data and/or instructions defining the desired output images can be stored in system memory 102 or graphics memory within display processor 110. In an embodiment, display processor 110 includes 3D rendering capabilities for generating pixel data for output images from instructions and data defining the geometry, lighting shading, texturing, motion, and/or camera parameters for a scene. Display processor 110 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 102 is connected to CPU 106 directly rather than through a bridge, and other devices communicate with system memory 102 via memory bridge 108 and CPU 106. In other alternative topologies display processor 110 is connected to I/O bridge 116 or directly to CPU 106, rather than to memory bridge 108. In still other embodiments, I/O bridge 116 and memory bridge 108 might be integrated into a single chip. The particular components shown herein are optional; for instance, any number of add-in cards or peripheral devices might be supported. In some embodiments, switch 122 is eliminated, and network adapter 126 and add-in cards 120, 124 connect directly to I/O bridge 116.

Figure 2:
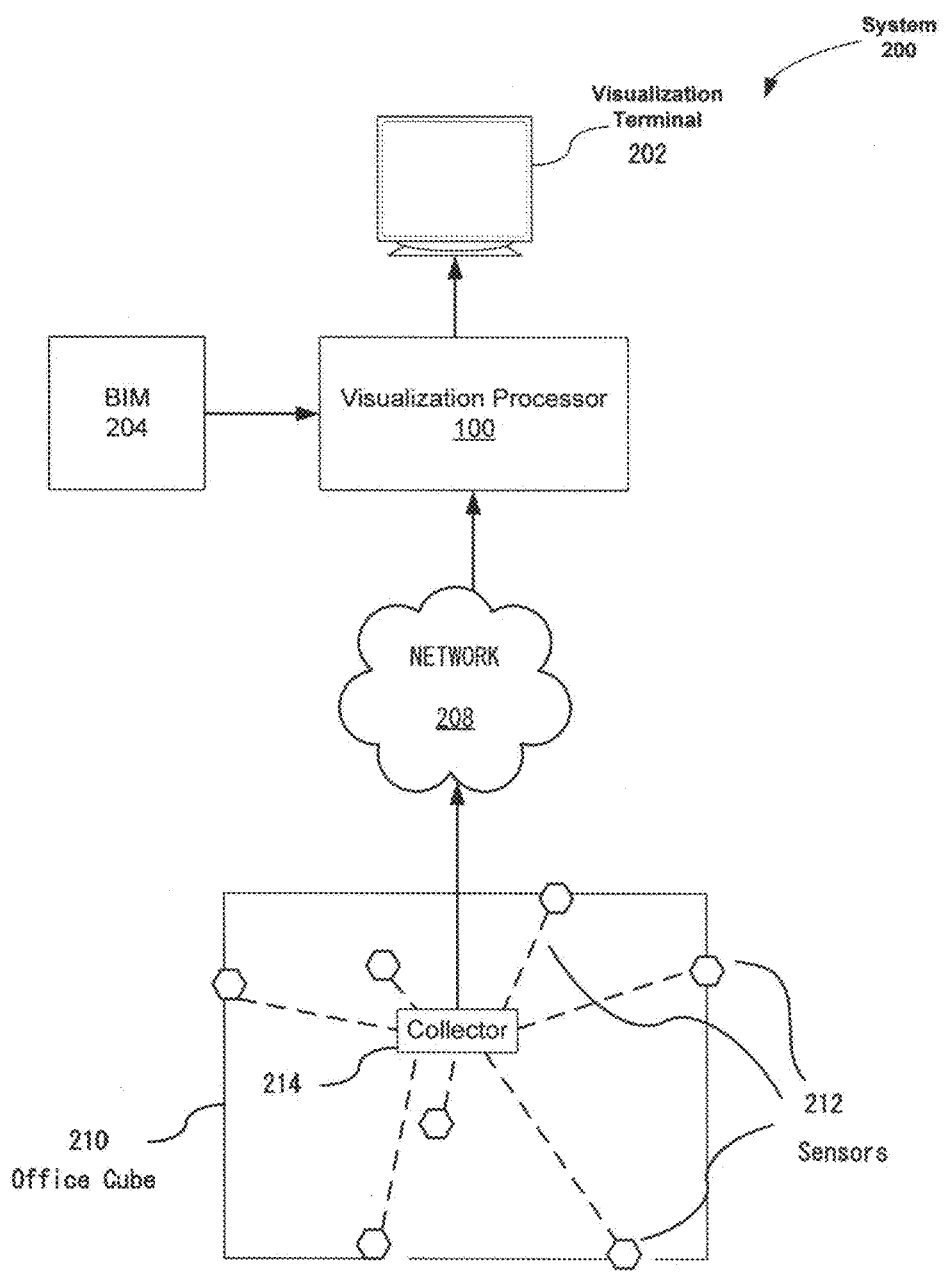
FIG. 2 is a logical diagram of a system for 3-D visualization of building data, according to one embodiment of the present invention.

FIG. 2 is a logical diagram of a system 200 for 3-D visualization of building data, according to one embodiment. Accordingly, system 200 includes a visualization terminal 202 and a visualization processor 100 that is coupled to a Building Information Modeling (BIM) system 204. In one embodiment, visualization terminal 202 and visualization processor 100 is implemented in a same computing system. A plurality of sensors 212 are installed at different locations in a building module 210. As described herein, building module 210 is an entire building or buildings, or a portion of the building, such as a floor, room, or cubicle. Some sensors 212 are embedded in physical objects inside or in the proximity of building module 210. Building module 210 is a part of a building that corresponds to one or more objects (BIM data models) in BIM system 204 for the building. BIM system 204 includes BIM data models corresponding to various parts of the building. Accordingly, BIM system 204 includes one or more BIM data models corresponding to building module 210. In one embodiment, BIM data models define bounding boxes (e.g., building module 210) and objects therein and may also includes one or more attributes of objects of building module 210. Further, in one aspect, system 200 semantically links objects in real world (e.g., office cube and physical objects inside an office cube, sensors, etc.) to BIM data models stored in BIM system 204. In one embodiment, some or all physical objects in building module 210 may include embedded one or more types of sensors. Some exemplary types of sensors include Radio Frequency Identification (RFID) tags, temperature sensors, gas sensors, current sensors, voltage sensors, power sensors, humidity sensors, etc. RFID tags may be active or passive depending upon a particular configuration of building module 210 and locations of RFID readers in and around building module 210. In one embodiment, BIM data models are represented in the industry standard IFC format. Some or all BIM data models may also include locations and types of sensors.

Visualization processor 100 and sensors 212 are coupled together through a network 208. In one embodiment, sensors 212 includes necessary logic to couple directly with network 208. In an alternative embodiment, sensors 212 are coupled to network 208 through sensor readers (not shown). Sensor readers may be placed at various locations in the building to receive data inputs from sensors 212. Sensor readers may also include logic to convert data inputs from sensors 212 to a format that is suitable for network 208 and/or visualization processor 100. In yet another embodiment, some sensors may couple directly to network 208 and others may couple to network 208 through one or more sensor readers. Some types of sensors may require sensor readers. For example a RFID tag may need a RFID reader. Visualization processor 100 may include processing logic to calculate and determine locations of sensors 212 based on triangulation and/or geolocation methods. In other embodiments, a BIM data model corresponding to building module 210 may include sensor and physical object location attributes and visualization processor 100 may receive sensor locations from BIM system 204 based on the locations of physical objects to which the sensors are attached. In one embodiment, if a BIM data model or BIM data model does not include locations and types of some or all sensors 212, the BIM data model is edited in a BIM authoring tool to include the necessary sensor location and type information. Furthermore, if the BIM data model includes a sensor which does not physically exist in the building or building module 210, the data related to this non-existent sensor may either be removed by editing the BIM data model or the sensor in question is marked inactive.

In one example, building module 210 is an employee workspace (e.g., a cube or an office). In other examples, building module 210 could be any area of the building as long as BIM system 204 provides a corresponding BIM data models. In other embodiments, if BIM system 204 does not include an object representation of a particular part of the building, a BIM data model is created in BIM system 204 based on the specifications of the particular part of the building. Visualization processor 100 leverages the semantic data available in a BIM data model to simulate and represent data in the 3D context. In one aspect, system 200 semantically links objects in the real world, such as sensors or cubicles, to objects found in BIM system 204. In addition to being configured to display the data collected from sensors 212, system 200 is configured to aggregate and process the data collected from sensors 212 and simulate 3D data representation models.

In one embodiment, sensors 212 are placed at random locations in building module 210. In another embodiment, sensors 212 are placed strategically in building module 210 in predetermined locations. For example, power sensors, current sensors and voltage sensors are placed near electrical sources or coupled to electrical sources.

Sensors 212 include different types of sensing and data collection devices. For example, sensors may include one or more of temperature sensors, humidity sensors, voltage sensors, power sensors, gas sensors, air flow sensors and light sensors, location sensors. It should be noted that other types of sensors that can provide data related to one or more aspects of building monitoring are also within the scope of this disclosure. As noted above, at least some of sensors 212 are embedded in physical objects inside building module 210. For example, sensors 212 may be embedded in chairs, tables, computers, electrical outlets, light sources, etc.

Sensors 212 are coupled to one or more data collection modules. Sensors 212 and data collection modules are placed at appropriate locations in or outside of building module 210 based on sensing ranges of data collection modules and sensors 212. In one embodiment, sensors 212 are coupled to network 208 through wires. In another example, sensors 212 may include wireless transmitters and can transmit data over the air to one or more data collection modules in the vicinity of building module 210. In yet another embodiment, some sensors 212 are wired and others are wireless. Building module 210 may also include a local data collector which can be configured to collect data from some or all sensors 212 in building module 210. The local data collector may then be coupled to network 208 through global data collectors that are placed in the vicinity of building module 210. In one embodiment, the X, Y, Z coordinates of sensors 212 are manually entered in visualization processor 100, which processes the data collected by data collection modules and renders the 3-D visualization of building module 210 based on the data collected from sensors 212. In another embodiment, the X, Y, Z coordinates of sensors 212 are calculated by either data collectors in the vicinity of building module 210 or visualization processor 100 based on location data provided by data collectors or the corresponding BIM data model. In one embodiment, if sensor locations are not provided by corresponding BIM data models, a Wi-Fi triangulation method is employed to calculate the X, Y, Z coordinates of sensors 212. In other embodiments, other geolocation methods and tools (e.g., GPS) may be employed. Geolocation is the identification of the real-world geographic location of an Internet-connected computer, mobile device, website visitor or other. In some embodiments, even if BIM models provide sensor locations and types, this information may still be collected using methods such as Wi-Fi triangulation and data type inputs form respective sensors because at least some sensors are attached to moveable objects in building module 210 or in the building. Since visualization processor 100 is configured to associate locations of sensors 212 with BIM data model(s) of building module 210, visualization processor 100 is able to generate building module visualization significantly accurately compared to existing 2-D visualizations.

In one embodiment, a fault tolerance feature is employed in that if some sensors 212 fail or their connectivity to network 208 is disrupted, visualization processor 100 may interpolate or extrapolate data from other sensors 212 of similar types. In other embodiments, visualization processor 100 may be configured to maintain a value ranges for some or all types of collected data based on historical data collection. visualization processor 100 is configured to disregard out of band values received from sensors 212 based on the previously determined value ranges for each type of collected data.

In one embodiment, sensors 212 are coupled to electrical outlets, light sources, heat sources, and power sources and heat/power consuming objects. In one embodiment, sensors may coupled directly to network 208 through an analog to digital interface. In another embodiment, a collector 214 is installed in each building module 210 and some or all sensors in each building module 210 are coupled to collector 214. A mapping of the location of collector 214 and cubicle of building module 210 is stored in system 200. In an alternate embodiment, a location of each collector 214 is automatically determined using for example Wi-Fi triangulation or geolocation methods. Collector 214 is configured to collect inputs from a plurality of sensors 212 in building module 210 and communicate the sensor data to visualization processor either in real time or at selected intervals. Network 208 is the same local area network (LAN) as used by computers and other computing equipments in building module 210. Alternatively, network 208 may be a dedicated network for collecting sensor data.

Collector 214 is coupled to network 208 either wirelessly or through wires. Collector 214 may include analog to digital converter or converters to convert analog data from analog sensors before transmitting the sensor data to visualization processor 100. Collector 214 is a standalone computing device or may also be either a hardware or software module that is incorporated in a user's computer in building module 210. Alternatively, collector 214 may be a standalone device which can be coupled to a user's computer through standard interfaces, such as Universal Serial Bus (USB) interface. At least some sensors 212 may include analog to digital converters and may provide digital data to collector 214 or directly to visualization processor 100 directly.

In one embodiment, visualization terminal 202 is a computing system that interfaces with visualization processor 100 to provide a visual 3-D representation of building module 210 and environmental conditions therein. Visualization terminal 202 receives display data from visualization processor 100 and displays the 3-D visualization of the received display data based on user configurations. Visualization terminal 202 may also be a computer terminal that is configured to be a graphical user interface to visualization processor 100. Visualization terminal 202 is configured to present the received visualization data in different visual and/or textual forms on a display screen based on system and user configurations. The system and user configurations may include parameters to direct visualization terminal 202 to display the received visualization data using various color schemes, labels, sounds, alerts, graphs and other types of graphical representations. Visualization terminal 202 may also be configured to switch among different visual representations of the same visualization data according to user inputs.

Traditionally, data collected through sensors is displayed using 2-D graphs. These graphs facilitate the study of certain trends over time, but do not explain, for example, why the values of, for example, light sensor A and light sensor B, which are incorporated in a same building module, are so different from each other. However, by correlating the values to features found in a 3D visualization model of the building module, it becomes evident that, for example, one side of the building module is more exposed to direct sun light coming from the windows.

In one embodiment, a user interface is provided to enable a user to select a building module from a plurality of building modules presented to the user on a computer screen. The user interface is displayed on visualization terminal 202. In an exemplary embodiment, visualization terminal 202 is incorporated in a mobile computing device or desktop computer. Upon selection, a 3-D visualization of the building module is displayed on the computer screen. The user may also select one or more environmental elements, such as temperature, air flow, light, etc. to be displayed on the computer screen in context of the displayed 3-D representation of the selected building module. A graphical representation of more than one environmental elements is displayed through overlapping layers or using different colors, textures, shades, etc. Furthermore, the user may also select a second building module to view the graphical representations of environmental elements side-by-side.

Figure 3:
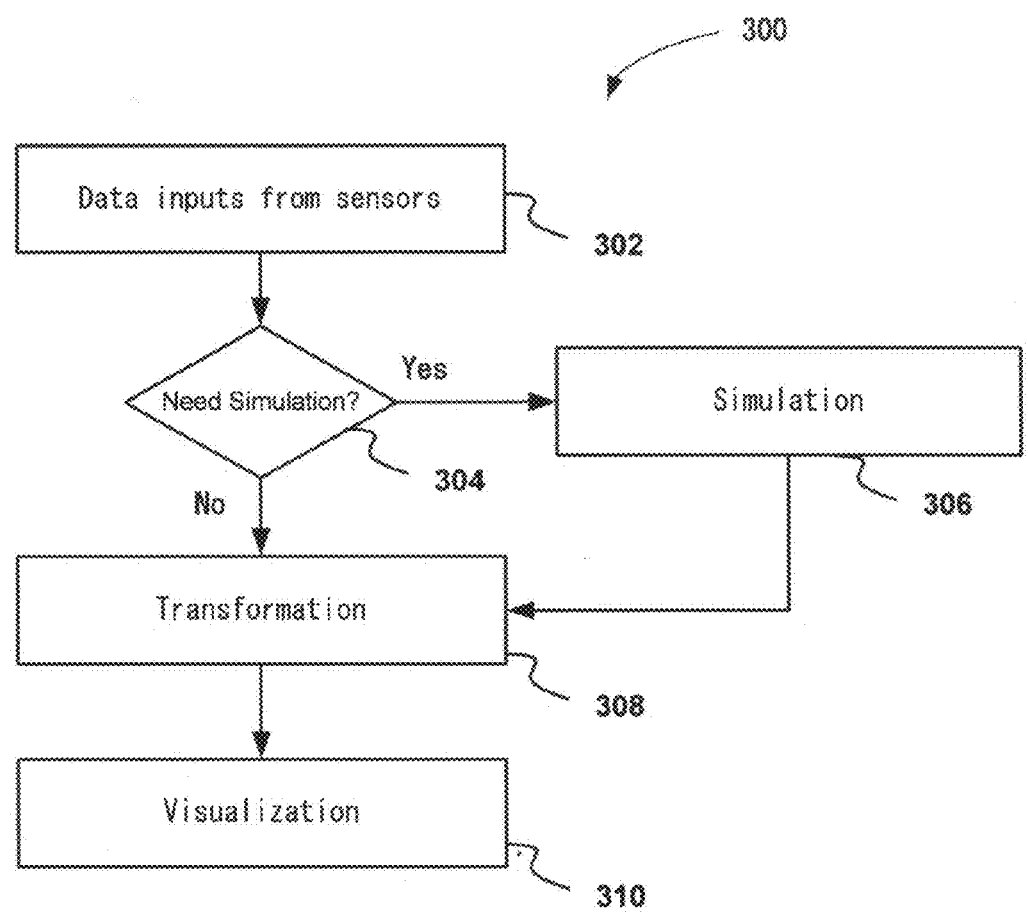
FIG. 3 illustrates a flow diagram for processing data inputs from sensors, according to one embodiment of the present invention.

FIG. 3 illustrates a flow diagram 300 for processing data inputs from sensors, according to one embodiment of the present invention. Accordingly, at step 302, visualization processor 100 receives data inputs from some or all sensors 212. At decision step 304, visualization processor 304 determines if there is any need for producing additional data points based on at least some data inputs. For example, unlike power usage, some phenomena are more complicated and cannot be accurately measured using sensor data alone. These types of data can be simulated within the 3D environment based on some sensor inputs. For instance, the intensity and temperature of air flow through an office can impact the comfort of the occupants. However, discretely sampling the airflow throughout the office does not provide enough input data for a 3D visualization of the air flow through the office. In such scenarios, data is simulated and the simulated data is inputed to visualization processor 100. If data simulation is needed, at step 306, additional data points are produced using simulation module 130. The additional data points are then supplied to transformation module 132 for a transformation. At step 308, transformation module 132 quantizes, biases, scales and filters the data according to the requirements of visualization module 104. Finally, at step 310, visualization module 104 produces 3-D visualization of building module 210 based on data inputs and simulated additional data points.

Figure 4A:
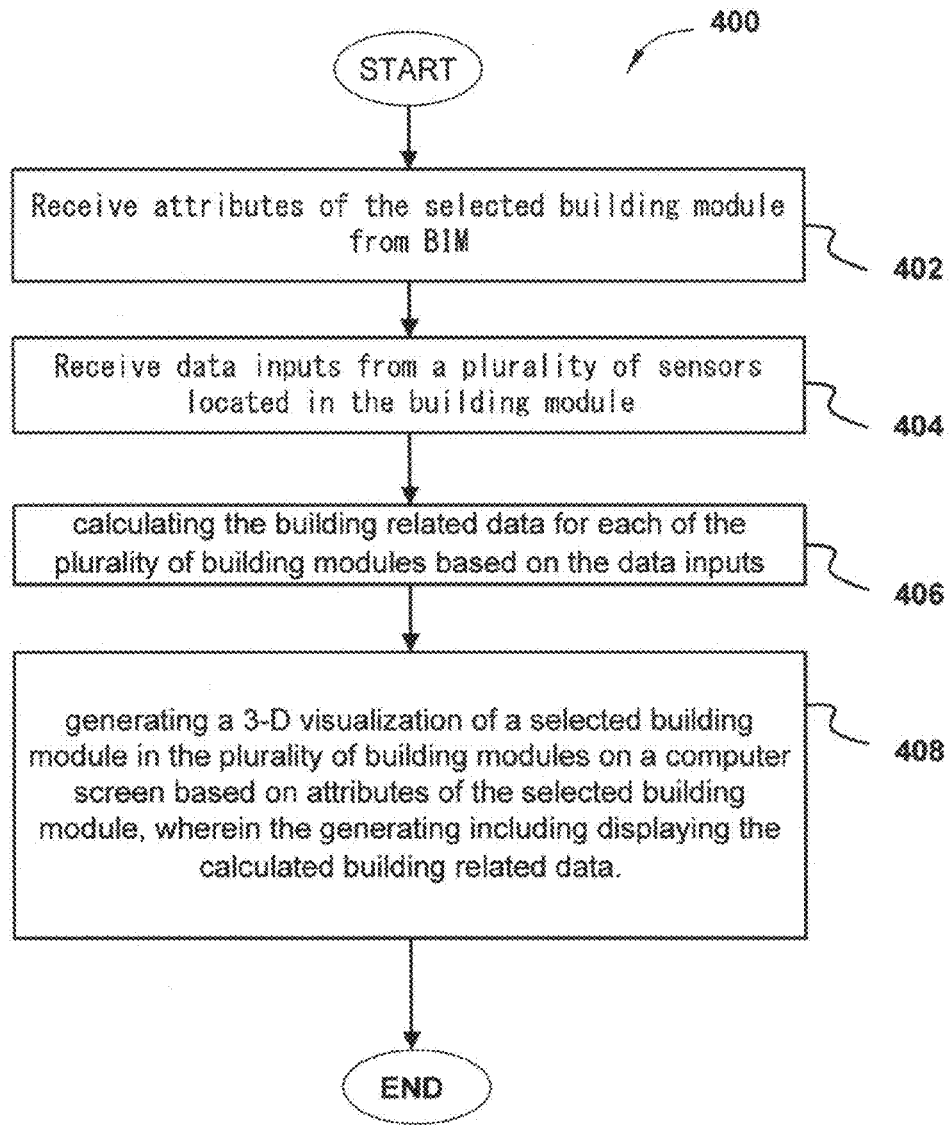
FIG. 4A illustrates a flow diagram of a method of a method of 3-D visualization of building module, according to one embodiment of the present invention.

FIG. 4A illustrates a flow diagram 400 for generating a 3-D visualization of a selected building module. Accordingly, at step 402, visualization processor 100 retrieves attributes of a selected building module 210 from BIM system 204. In one embodiment, attributes are received as a part of BIM data model corresponding to the selected building module 210. At step 404, visualization processor 100 receives data inputs from a plurality of sensors located in a plurality of building modules, including building module 210. Data inputs from sensors that are located outside of the building and also in proximity of building module 210 may also be received by visualization processor 100. At step 406, visualization processor 100 calculate the building related data for each of the plurality of building modules based on the data inputs from a plurality of sensors. Visualization processor 100 may simulate some data based on the data inputs. Further, visualization processor 100 may also transform some data inputs to make data inputs suitable for calculating and processing by visualization module 104. At step 408, visualization processor 100 in conjunction with visualization terminal 202 generates a 3-D visualization of the selected building module 210 attributes of the selected building module 210. The 3-D visualization on visualization terminal 202 includes displaying the calculated building related data.

FIG. 4B illustrates an exemplary visualization 410 of a building which includes a rich graphical representation of a plurality of building modules (e.g., cubicles or work spaces). Visualization processor 100 processes BIM data models to provide a rich 3-D visualization of the building. In one embodiment, individual building modules are click sensitive in that a user, through a user interface on visualization terminal 202, may select one or more building modules and drill down to the visualization of the select building module(s). That is, a user of visualization terminal 202 may select a particular building module to get further information of performance data related to the selected building module 210.

FIG. 4C illustrates an exemplary visualization of building module 210 when building module 210 is selected by the user through a drill-down user interface on visualization terminal 202. In the exemplary embodiment shown in FIG. 4C, when the user drills down to building module 210 level, a variety of contextual data related to the selected building module 210 is displayed along with the 3-D visualization of the selected building module 210. For example, as shown in FIG. 4C, the visualization of building module 214 includes power usages (e.g., 60 W). Such configurable data is displayed in textual form or in graphical form. For example, if the user configures the user interface to show air flow in building module 210, such display may include representing the air flow graphically instead of textually. In one embodiment, building data related to a plurality of building modules is visualized simultaneously. In another embodiment, the user may select more than one building modules to view respective building module data comparatively.

Data acquired from sensors or through data simulations based on input data from sensors 212 can be described as either logical, scalar, vector or semantic. Logical data (typically, true or false) can be used to describe the presence or absence of certain object in a visualization. Scalar data pertains to continuous on-dimensional real values (e.g., temperature and energy usage). Vector data pertains to real values, with direction and magnitude (e.g., air velocity). Semantic data is used for tags and properties which identify geometry as building elements, such as walls, structure, HVAC, chairs, desks, windows, etc.

In one embodiment, a surface shading technique is used to calculate data values of some attributes in a space. Given a scalar field, a gradient shading can be applied to surfaces which attenuate with the distance and intensity of nearby data points. A sparse 3D scalar field can be visualized on surface geometry by computing an inverse distance weighted-sum between surface points and all the data points in the field. In one embodiment in which the visual representation include color shading, this sum is then mapped to color and used to shade the corresponding point. Temperature readings, for example, can be taken from different areas in the office and then mapped to provide an approximate visualization of temperature changes across the office. Power usage can be represented in the same way giving users the ability to quickly determine areas of high power consumption. Transient geometry refers to auxiliary geometry that is not originally present in the scene since it exists only so long as the visualization is presented to a user. The benefit of transient geometry over direct rendering methods is that visualizations are not limited to the surfaces of the existing geometry, thus more complex 3D data can be represented.

The simplest implementation of this group of methods is in the form of glyphs. Glyphs are symbolic representations of single data points, such as an arrow. Arrow glyphs can be used to represent discrete vector data samples making it is possible to visualize complex phenomenon, such as air movement through a space. Glyphs can also be used as an alternative to direct rendering methods of displaying logical data. For example, point marker glyphs can be used to mark particular points of interest in 3D space. In particular glyphs can be used to mark points whose data originated from a sensor reading. This differentiates mark points from points whose data values have been interpolated. Similarly, occupancy can also be visualized using glyphs. Using simple motion sensors and a small set of video cameras, building occupancy can be monitored. This data can then be represented using peg-like glyphs, which provide an abstract representation of occupants in a space. The combination of base and stem parts ensure that pegs are always visible from a variety of viewing directions, including head-on or from the top. Their abstract nature avoids conveying potentially misleading information about which direction the occupant is facing (this is not the case when representing occupants with human-like billboards). To reduce visual clutter, pegs are aggregated when they are within a certain radius of one another. Aggregated pegs are distinguished from single pegs by using a combination of colouring, text and segmentation of the inner ring.

In one embodiment, visualization terminal 202 is configured to display some parameters using arrows or other types of visual objects that may provide similar representations. Color schemes may also be used in other embodiments. For example, a visual representation using a text label may be provided for real time display of power usages associated with an electrical outlet, for example. Alternatively and based on system and user configurations, appropriate graphical representations may be used to visualize the same data. In other embodiments the color of the electrical outlet may be changed corresponding to power usages. For example, a green color may represent power usage within 0-20 W, orange for power usage within 21-50 W and so on.

FIGS. 5A-5D illustrates a drill-down user interface (UI) 500 and data sorting method by selected building modules of a building. Accordingly, visualization terminal 202 displays drill-down UI 500 to enable a user to select the whole building (located at a fictitious address 210 King St. in the example), a particular floor (e.g., 5$^{th}$ floor in the example), a particular area (e.g., Research Area South in the example), a particular cube or even a particular power outlet in a particular cube, for example. Note that a power outlet is being used simply as an example. Other types of elements (e.g., light sources, air flow module, heat sources, etc.) may also be selected.

Upon selection of a particular node in drill-down UI 500, visualization terminal 202 displays a 3-D visualization of the selected element. Further, in one embodiment, drill-down UI 500 also displays aggregate values by each node in drill-down UI 500. As apparent from FIG. 5A, total power usage for the exemplary building located at 210 King St. are shown as 225776.3 W. In one embodiment, this displayed data is collected and displayed in real time. In other embodiment, the data inputs from sensors 212 are collected and stored in a persistent datastore (e.g., on system disk 118). The user may then view data for particular days, dates, times, etc. The user may also be able to perform comparative and analytical analysis on the stored or displayed data. In another embodiment, the user may select multiple nodes in drill down UI 500 (e.g., Cubicle 5002 and Cubicle 5003) to see power usage (for example) and 3-d visualization of the selected cubicle simultaneously. Note that display, of power usage is exemplary. Drill-down UI 500 can be configured to display other types of data so long as such type of data is collected through sensors 212. Further, drill-down UI 500 is configured to display different types of data using user configurable visualization methods (e.g., graphically, textually, etc.) simultaneously. Drill-down UI 500 may also be configured to display building data using various user configurable color schemes, color gradients, etc. Note that, in one embodiment, data collected from sensors 212 is not directly displayed in drill-down UI 500. The collected data is one or more processed, simulated, transformed, stored for the 3-D visualization of building module 210 or the entire building or any part of a selected building.

Figure 6:
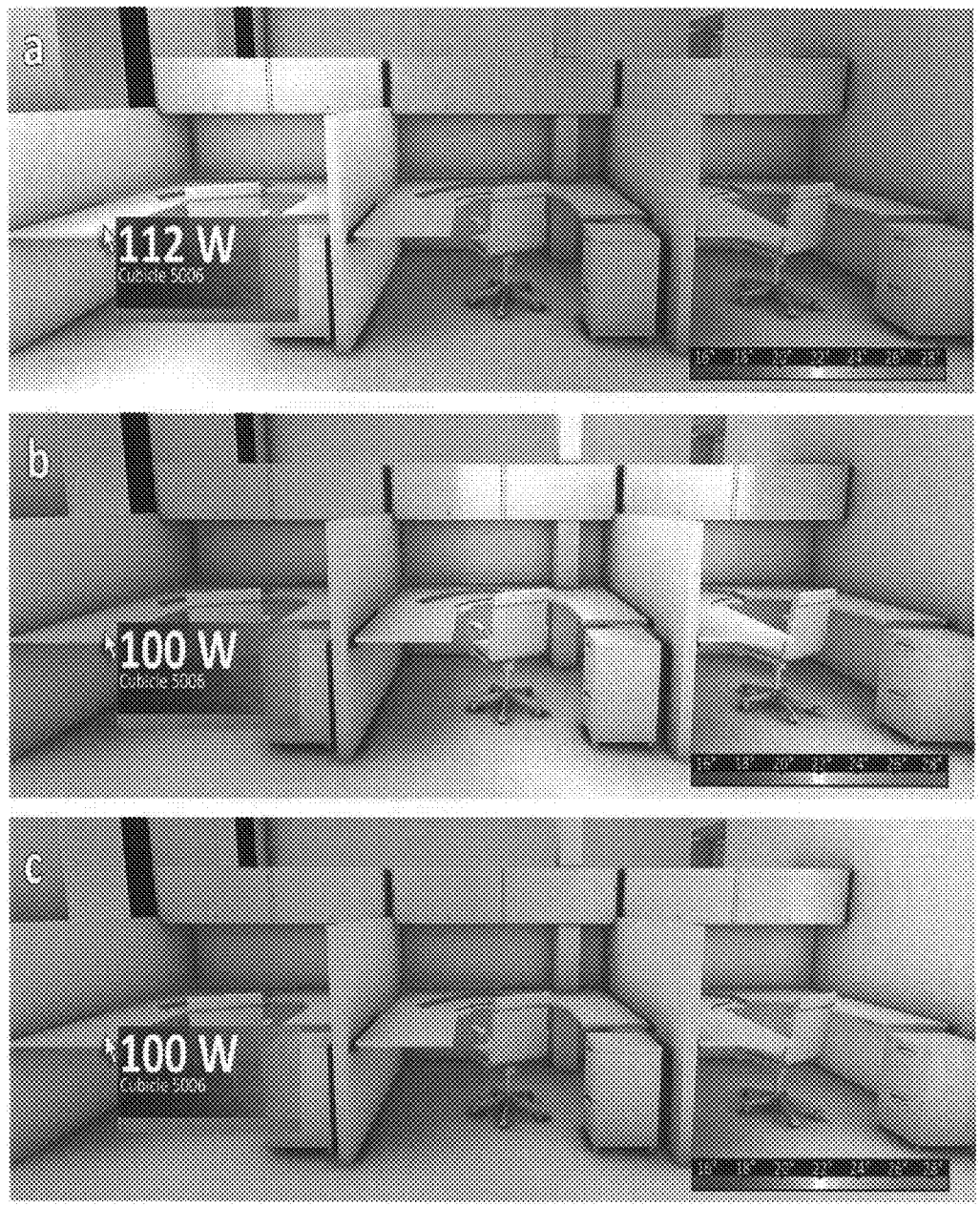
FIG. 6 illustrates an exemplary time based visualization of temperature across three building cubes, according to one embodiment of the present invention.

FIG. 6 are snapshots of a time-based visualization of temperature across three cubicles. For example, snapshots are taken at (a) 8:00 AM. (b) 11:00 AM. (c) 2:00 PM. Note that a reference to "temperature" is simply exemplary. Other environmental or electrical elements may also be visualized using the time-based visualization methods. As apparent, FIG. 6 shows gradient shading and power usage over time.

In one embodiment, the visualization of building data is based on the spatiotemporal dimension of time-varying data. Further, using direct rendering methods, system 200 can map aggregate values of different time intervals on top of the 3D visualization for visual analysis. Gradient shading is applied to surfaces which attenuate with the distance and intensity of data points. Temperature sensor values (for example) is mapped to color values which are applied to the corresponding point in space. Given the density of the data collection, gradient shading method is used to approximate the changes across each cubicle threshold. In other embodiments, other performance factors such as power usage can be simultaneously displayed as Heads-Up Displays (HUDs) to reveal additional information related to a local feature.

Figure 7:
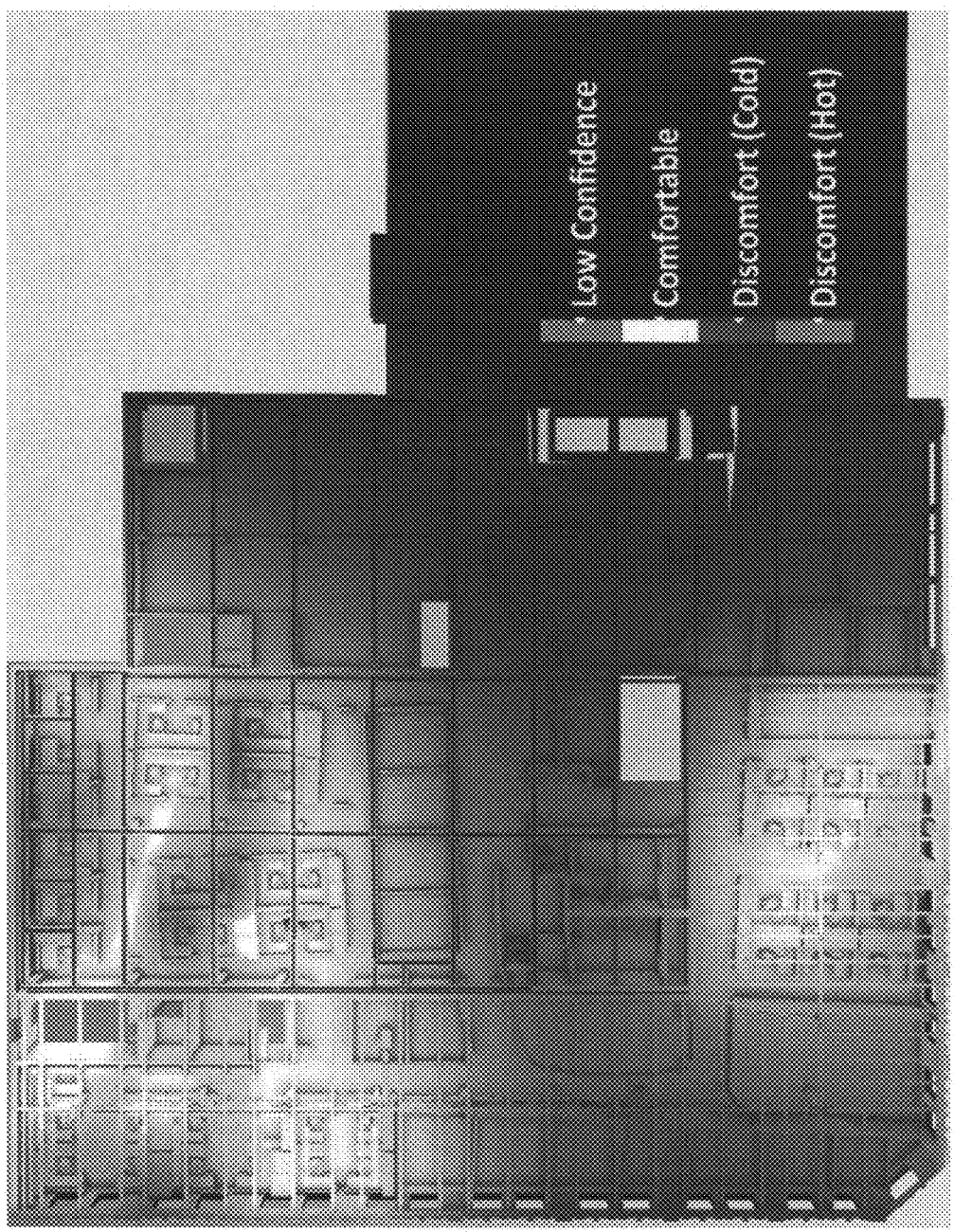
FIG. 7 illustrates an exemplary confidence level visualization using gradient gray overlay, according to one embodiment of the present invention.

FIG. 7 illustrates using a gradient gray overlay to render areas of "Low-Confidence" in a building or a part of the building. In one embodiment, direct rendering methods are used to gain a deeper spatial understanding about thermal behaviors, for instance, in a selected part of the building. Direct rendering methods are used to highlight areas of thermal comfort or discomfort. Based locations of sensors in the building or in a selected part of the building, areas of the building are distinguished as "high-confidence" and "low-confidence" to better convey the displayed data to a user. In one embodiment, the exemplary confidence levels reflect the proximity of sensors in a given area and illustrated through a gradient gray overlay. In one embodiment, the confidence level in a particular area is represented numerically and based on historical analysis and calibration methods, data displayed in drill-down UI 500 is adjusted according to the confidence level for the selected node in drill-down UI 500. In one example, as shown in FIG. 7, different building areas are visualized in different colors, textures or shading to indicate "low confidence," "comfortable," discomfort (cold)," and "discomfort (hot)."

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

We claim:

1. A computer implemented method of 3-D visualization of a building module and building related data, comprising:
   receiving attributes of a plurality of building modules from a building information model;
   receiving data inputs from a plurality of sensors located in a selected building module included in the plurality of building modules;
   determining a location of at least one sensor included in the plurality of sensors by receiving, from the building information model, X, Y, and Z coordinates of the sensor;
   determining that at least one sensor included in the plurality of sensors has failed;
   in response to determining that the least one sensor has failed, interpolating or extrapolating the data inputs associated with one or more other sensors included in the plurality of sensors to generate simulated data points;
   calculating the building related data for the selected building module based on the data inputs, the simulated data points, and the X, Y, and Z coordinates of the sensor, wherein the building related data is calculated by applying a gradient shading technique to determine, from a 3-D scalar field of data points corresponding to at least the data inputs from the sensors, colors used to shade points on one or more surfaces of the selected building module; and
   generating the 3-D visualization of the selected building module based on the attributes and the building related data of the selected building module for display on a computer screen.

2. The computer implemented method of claim 1, wherein the data inputs are transformed before the calculating.

3. The computer implemented method of claim 1, further including determining locations of at least a subset of the plurality of sensors, wherein the locations include X, Y, and Z coordinates of each of the subset of the plurality of sensors and the locations of at least the subset of the plurality of sensors are determined through a triangulation method.

4. The computer implemented method of claim 1, wherein the selected building module is selected by a user from a hierarchical list of the plurality of building modules.

5. The computer implemented method of claim 1, wherein the calculating is based on a quality of data inputs based on proximity of one or more of the plurality of sensors from to be visualized parts of the selected building module.

6. The computer implemented method of claim 1, wherein the 3-D visualization includes at least one of a graphical visualization of heat sources, a graphical visualization of heat sinks, a visualization of light sources and a visualization real time power usage.

7. The computer implemented method of claim 6, wherein the graphical visualization of heat sources and the graphical visualization of heat sinks includes using an arrow in a 3-D space to indicate sources and sinks.

8. The computer implemented method of claim 1, wherein the building related data comprises a level of confidence associated with the data inputs, and generating the 3-D visualization comprises rendering at least one area of the selected building module to visualize the level of confidence.

9. The computer implemented method of claim 1, wherein determining that the at least one sensor has failed comprises determining that connectivity of the sensor to a network has been disrupted.

10. The computer implemented method of claim 1, wherein generating the 3-D visualization of the selected building module comprises generating a visual representation of a power outlet included in the selected building module, wherein a color of the power outlet is based on a power usage value.

11. A non-transitory computer readable storage medium storing instructions that, when executed by a host computer, cause the host computer to carry out operations to generate, via one or more processors, a 3-D visualization of a building module, the operations including:
    receiving attributes of a plurality of building modules from a building information model;
    receiving data inputs from a plurality of sensors located in a selected building module included in the plurality of building modules;
    determining a location of at least one sensor included in the plurality of sensors by receiving, from the building information model, X, Y, and Z coordinates of the sensor;
    determining that at least one sensor included in the plurality of sensors has failed;
    in response to determining that the least one sensor has failed, interpolating or extrapolating the data inputs associated with one or more other sensors included in the plurality of sensors to generate simulated data points;
    calculating building related data for the selected building module based on the data inputs, the simulated data points, and the X, Y, and Z coordinates of the sensor, wherein the building related data is calculated by applying a gradient shading technique to determine, from a 3-D scalar field of data points corresponding to at least the data inputs from the sensors, colors used to shade points on one or more surfaces of the selected building module; and
    generating the 3-D visualization of the selected building module based on the attributes and the building related data of the selected building module for display on a computer screen.

12. The non-transitory computer readable storage medium of claim 11, wherein the data inputs are transformed before the calculating.

13. The non-transitory computer readable storage medium of claim 11, further including determining locations of at least a subset of the plurality of sensors, wherein the locations include X, Y, and Z coordinates of each of the subset of the plurality of sensors and the locations of at least the subset of the plurality of sensors are determined through a triangulation method.

14. The non-transitory computer readable storage medium of claim 11, wherein the selected building module is selected by a user from a hierarchical list of the plurality of building modules.

15. The non-transitory computer readable storage medium of claim 11, wherein the calculating is based on a quality of data inputs based on proximity of one or more of the plurality of sensors from to be visualized parts of the selected building module.

16. The non-transitory computer readable storage medium of claim 11, wherein the 3-D visualization includes at least one of a graphical visualization of heat sources, a graphical visualization of heat sinks, a visualization of light sources and a visualization real time power usage.

17. The non-transitory computer readable storage medium of claim 16, wherein the graphical visualization of heat sources and the graphical visualization of heat sinks includes using an arrow in a 3-D space to indicate sources and sinks.

18. The non-transitory computer readable storage medium of claim 11, wherein the building related data comprises a level of confidence associated with the data inputs, and generating the 3-D visualization comprises rendering at least one area of the selected building module to visualize the level of confidence.

19. A system for generating a 3-D visualization of a building module, the system comprising:
   a memory; and
   a processor coupled to the memory and configured to:
      receive attributes of a plurality of building modules from a building information model;
      receive data inputs from a plurality of sensors located in a selected building module included in the plurality of building modules;
      determine a location of at least one sensor included in the plurality of sensors by receiving, from the building information model, X, Y, and Z coordinates of the sensor;
      determine that at least one sensor included in the plurality of sensors has failed;
      in response to determining that the least one sensor has failed, interpolate or extrapolate the data inputs associated with one or more other sensors included in the plurality of sensors to generate simulated data points;
      calculate building related data for the selected building module based on the data inputs, the simulated data points, and the X, Y, and Z coordinates of the sensor, wherein the building related data is calculated by applying a gradient shading technique to determine, from a 3-D scalar field of data points corresponding to at least the data inputs from the sensors, colors used to shade points on one or more surfaces of the selected building module; and
      generate the 3-D visualization of the selected building module based on the attributes and the building related data of the selected building module for display on a computer screen.

* * * * *